US006711567B2

(12) United States Patent
Littlefield et al.

(10) Patent No.: US 6,711,567 B2
(45) Date of Patent: *Mar. 23, 2004

(54) DELIVERING NON-DEFAULT ITEMS IN ASSOCIATION WITH SEARCH RESULTS

(75) Inventors: Andrew Littlefield, San Mateo, CA (US); Matthew Charles Grogan Hall, San Jose, CA (US); Michael E. Palmer, San Francisco, CA (US); Troy Richardson Toman, San Carlos, CA (US)

(73) Assignee: Inktomi Corporation, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/365,838

(22) Filed: Feb. 12, 2003

(65) Prior Publication Data

US 2003/0120646 A1 Jun. 26, 2003

Related U.S. Application Data

(63) Continuation of application No. 09/513,238, filed on Feb. 24, 2000, now Pat. No. 6,564,208.

(51) Int. Cl.[7] .............................................. G06F 17/30
(52) U.S. Cl. ........................................................ 707/3
(58) Field of Search ............................. 707/2–10, 200; 709/224

(56) References Cited

U.S. PATENT DOCUMENTS

| 5,796,952 | A | * | 8/1998 | Davis et al. ................ 709/224 |
| 5,877,766 | A | | 3/1999 | Bates et al. |
| 6,102,406 | A | | 8/2000 | Miles et al. |
| 6,128,663 | A | | 10/2000 | Thomas |
| 6,243,104 | B1 | | 6/2001 | Murray |
| 6,311,194 | B1 | | 10/2001 | Sheth et al. |
| 6,321,091 | B1 | | 11/2001 | Holland |
| 6,324,264 | B1 | | 11/2001 | Wiener et al. |
| 6,338,068 | B1 | * | 1/2002 | Moore et al. ................ 707/102 |
| 6,424,968 | B1 | * | 7/2002 | Broster et al. .................. 707/3 |
| 6,427,020 | B1 | | 7/2002 | Rhoads |
| 6,516,311 | B1 | * | 2/2003 | Yacoby et al. .................. 707/3 |
| 6,529,899 | B1 | * | 3/2003 | Kraft et al. .................... 707/3 |
| 6,564,208 | B1 | * | 5/2003 | Littlefield et al. ............. 707/3 |

FOREIGN PATENT DOCUMENTS

| WO | WO 98/36366 | 8/1998 |
| WO | WO 99/12106 | 3/1999 |

OTHER PUBLICATIONS

Sack, Warren, MIT Media Laboratory, "Conversation Map: A Content–Based Usenet Newsgroup Browser", 2000, ACM, pp 233–240.

Mukherjea et al., C&C Research Laboratories, NEC USA Inc., "Using Clustering and Visualization for Refining the Results of a WWW Image Search Engine", 2000, ACM, pp. 29–35.

Roussinov et al., Department of MIS, University of Arizona, "Information Forage through Adaptive Visualization", 1998, ACM, pp. 303–304.

* cited by examiner

*Primary Examiner*—Greta Robinson
*Assistant Examiner*—Sathyanaraya R Pannala
(74) *Attorney, Agent, or Firm*—Hickman Palermo Troung & Becker LLP; John D. Henkhaus

(57) ABSTRACT

Techniques are provided for delivering search results pages to the users of a search engine, where one or more search result listings on the search results pages include items that are not included by default. The non-default items may take many forms, including but not limited to images, banners, controls, animations, and even Java applets. The non-default items may be designed to entice the search engine users to select the search result listing with which they are associated over possibly higher-ranked search result listings that contain only default items.

4 Claims, 3 Drawing Sheets

FIG. 1B

Search Results: palm pilot
1. 3Com l Palm Computing

Palm Computing ~ 150a Non-default item http://www.palm.com/

2. Pilot Island Publishing, Inc. - software and hardware technology for palm-top computers-Home
Pilot IslandPublishing, Inc. - software and hardware technology for palm-top computers - Home Pilot Island Got Your Goodies? Gotta Get More Goodies! Turn Your Organizer into a Multimedia Monster!! Pilot Goodies™ features the BreEze™ interface, whic ~ 120 Default items
http://www.pilotisland.com/

3. GPS Pilot GPS software for the Palm device.
GPS Pilot GPS software for the Palm device. GPS technology on your Palm How to Products GPS Reviews Download Register Now FAQ Contact us For use with the 3Com Palm device and GPS receiver. Your Link to the Stars. The re ~ 120 Default items
http://www.gpspilot.com/

4. Palm Pilot
Palm Pilot Welcome to the Eurocool archive! We list over 1200 Palm Pilot apps, and provide many different ways to find the app you want... The PalmPilot and Workpad site [Apps] [Submit] [Hardware] [DevZone] [Subscribe] [FAQ] [Contact] Search f ~ 120 Default items
http://www.eurocool.com/

5. PDAs - Find best prices at 20-20 Consumer a FREE Service shopnow.com  CONSUMER GUIDE
CONNECTING BUYERS AND SELLERS WORLDWIDE   HELPING CONSUMERS SEE CLEARLY
YOUR TRUSTED SOURCE FOR ONLINE PRICE, PRODUCT AND MERCHANT COMPARISONS.
Rate a merchant... ~ 150b Non-default item http://www.pdapage.com/

Ticker- JP
Jefferson Pilot Corp
Exchange - NYSE

Company Address
Palm Pilot Gear Hq
2500 E. Randol Mill Rd #117
Arlington
TX
US
76011-6302
www.palmhelp.com Advertising KBkids.com Autumn Furby
$24.95 Special Offer!

DELIVERING NON-DEFAULT ITEMS IN ASSOCIATION WITH SEARCH RESULTS

CROSS-REFERENCE TO RELATED APPLICATIONS

This is a continuation application of U.S. patent application Ser. No. 09/513,238 filed on Feb. 24, 2000 U.S. Pat. No. 6,564,208 isssued on May 13, 2003; which is incorporated by reference in its entirety for all purposes as if fully set forth herein.

FIELD OF THE INVENTION

The present invention relates to computer systems and, more particularly, to techniques for delivering non-default items in association with search results.

BACKGROUND OF THE INVENTION

The Internet, often simply called "the Net," is a worldwide system of computer networks and, in a larger sense, the people using it. The Internet is a public, self-sustaining facility that is accessible to tens of millions of people worldwide. The most widely used part of the Internet is the World Wide Web, often abbreviated "WWW" or simply referred to as just "the Web". The Web is an Internet service that organizes information through the use of hypermedia. The HyperText Markup Language ("HTML") is used to specify the contents and format of a hypermedia document (e.g., a Web page).

In this context, an HTML file is a file that contains the source code for a particular Web page. A Web page is the image that is displayed to a user when a particular HTML file is rendered by a browser application program. Unless specifically stated, an electronic or Web document may refer to either the source code for a particular Web page or the Web page itself.

Each page can contain imbedded references to images, audio, or other Web documents. A user, using a Web browser, browses for information by following references, known as hyperlinks, that are embedded in each of the documents. The HyperText Transfer Protocol ("HTTP") is the protocol used to access a Web document.

Through the use of the Web, individuals have access to millions of pages of information. However a significant drawback with using the Web is that because there is so little organization to the Web, at times it can be extremely difficult for users to locate the particular pages that contain the information that is of interest to them.

To address this problem, a mechanism known as a "search engine" has been developed to index a large number of Web pages and to provide an interface that can be used to search the indexed information by entering certain words or phases to be queried. Indexes are conceptually similar to the normal indexes that are typically found at the end of a book, in that both kinds of indexes comprise an ordered list of information accompanied with the location of the information. Values in one or more columns of a table are stored in an index, which is maintained separately from the actual database table. An "index word set" of a document is the set of words that are mapped to the document in an index. For documents that are not indexed, the index word set is empty.

Although there are many popular Internet search engines, they are generally constructed using the same three common parts. First, each search engine has at least one "spider" that "crawls" across the Internet to locate Web documents around the world. Upon locating a document, the spider stores the document's Uniform Resource Locator (URL), and follows any hyperlinks associated with the document to locate other Web documents. Second, each search engine contains an indexing mechanism that indexes certain information about the documents that were located by the spider. In general, index information is generated based on the contents of the HTML file. The indexing mechanism stores the index information in large databases that can typically hold an enormous amount of information. Third, each search engine provides a search tool that allows users to search the databases in order to locate specific documents that contain information that is of interest to them.

The search engine provides an interface that allows users to specify their search criteria and, after performing a search, an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. The specific techniques for determining that ranking will vary from implementation to implementation, and the present invention is not limited to any particular ranking technique.

Once the matching documents have been determined, and the display order of those documents has been determined, the search engine sends to the user that issued the search a "search results page" that presents information about the matching documents in the selected display order. Typically, number of documents that match a search is so large that the user is presented with a search results page that only displays information about the top N ranking documents, where N may be significantly smaller than the total number of matching documents. The search results page typically includes a control that allows the user to retrieve information about the "next N" matching documents, in case the first N matching documents do not entirely satisfy the users interest.

Significantly, the search results pages do not present to users the matching documents themselves, but merely data that identifies the matching documents. The data presented by the search results page for any given matching page is referred to herein as the "search result listing" for the page. The search result listings that are presented by the search results page frequently take the form of text that has been extracted from the documents themselves. For example, search results may present the "title" and "abstract" of each matching web page, where the title and abstract consist of text extracted from corresponding meta-data fields within the web pages. Typically, each search result listing is presented in the form of a hypertext link which, when selected, causes the user's browser to retrieve the corresponding matching document.

Currently, within a given search results page, there is little beyond display order and text description to distinguish one page's search result listing from the search result listing of other web pages. For example, the search result listing for each document is typically all text, where the amount of text cannot exceed a certain limit, and where the text of all entries has the same default attributes (e.g. the same font, the same font size, the same color, etc.) The default text attributes that apply to search result listings are dictated by the search result page, the settings of the browser in which the web page is displayed, or both.

The success of a company can hinge on the frequency at which a company's web page is selected as a matching web page by a popular search engine, and the frequency at which the web page is selected from the search results page on which it is presented. For example, a company that sells chocolates over the Internet is likely to fail if its web page does not match a search that uses the terms "buy chocolate", or if users fail to select the web page when it is listed in the search results. Due to the commercial importance of having search engine users locate and select a company's web page, some web page owners go so far as to stuff their web pages with non-displayed content that is intended to ensure that their pages match popular searches and receive high rankings among the search results.

Based on the foregoing, it is clearly desirable to provide techniques that allow web page owners to entice search engine users to select the search result listings associated with their web pages without employing artifices for artificially increasing the search rank assigned to their web pages.

SUMMARY OF THE INVENTION

Techniques are provided for delivering search results pages to the users of a search engine, where one or more search result listings on the search results pages include items that are not included by default. The non-default items may take many forms, including but not limited to images, banners, controls, animations, and even applets in the JAVA language. The non-default items may be designed to entice the search engine users to select the search result listing with which they are associated over possibly higher-ranked search result listings that contain only default items.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B illustrates a browser displaying another search results page in which some of the search result listings include non-default items. The trademarks set forth in this figure are the property of their respective owners. All rights reserved.

DETAILED DESCRIPTION OF THE PREFERRED EMBODIMENT

Figure 1A:
FIG. 1A illustrates a browser displaying a search results page in which some of the search result listings include non-default items. The trademarks set forth in this figure are the property of their respective owners. All rights reserved.

A method and system are described for providing search results pages that contain non-default items associated with search result listings. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided for delivering search results pages to the users of a search engine, where one or more search result listings on the search results pages include items that are not included by default. The non-default items may take many forms, including but not limited to images, banners, controls, animations, and even applets in the JAVA language. The non-default items may be designed to entice the search engine users to select the search result listing with which they are associated over possibly higher-ranked search result listings that contain only default items.

The party that controls the search engine may charge web page owners in a manner similar to the publishers of directories such as the YELLOW PAGES. For example, web page owners may subscribe to have a graphic that depicts their logo associated with their web page, or with an entire domain. The amount charged by the search engine controller may vary based on a variety of factors, including the size and type of the non-default items that web page owners desire to associate with the search result listings for their pages. Instead of or in addition to a subscription fee for associating non-default items with search result listings, search engine provider may also charge click-through fees based on how many times the search engine users actually select a search result listing that is associated with a non-default item.

By providing web page owners the ability to compete for the attention of the users of a search engine through the use of non-default content, the incentive for those web page owners to employ artificial means to obtain higher search rankings is reduced. Consequently, the integrity and accuracy of search engine results may improve.

Establishing Associations with Non-Default Items

A variety of techniques may be used to establish associations between search result listings and non-default items. For example, a company may pay a yearly subscription fee to have a particular graphic, such as a company logo, associated with the home page of the company. To facility such subscriptions, the search engine provider may establish a web server for receiving such subscriptions over the Internet. The web server presents users with a web page that includes interface controls for specifying a web page, and for specifying the non-default item(s) to associate with the web page. The web page may include, for example, controls for indicating that the search result listing for the page should be shown in bold, in a particular font, and/or in a font of a particular size. The web page may also include controls for uploading other types of non-default items. For example, the web page may include controls that allow the subscriber to upload a graphic, an audio file, an applet in the JAVA language, or a movie file.

Once the subscriber has identified the web page and specified or uploaded the non-default items to be associated with the web page, the web server stores the non-default items, and/or metadata that identifies any specified non-default text attributes, on a storage device that is accessible by the search engine.

According to one embodiment, an index value is generated for each web page for which a subscription has been created by applying a hash function to data that uniquely identifies the web page, such as the URL of the web page. A "subscribed web page index" is established that allows each web page to be located and efficiently retrieved from the storage device based on the index value thus generated for the web page.

Instead of or in addition to web-page-specific subscriptions, a mechanism is provided which allows domain-specific subscriptions. For example, a company may have registered the domain mycompany.com. The company could obtain a subscription that associates a graphic representing the logo of the company with the domain name. In response to the subscription request, the graphic is stored on a storage device accessible to the search engine, and indexed in a "subscribed domain names index" based on the domain name.

The actual location at which the non-default items are stored, and the retrieval mechanism used to deliver the non-default items on the appropriate search results pages, will vary from implementation to implementation. For example, in another embodiment, the non-default items are stored in the same database or directory that is used by the search engine to store the default listings for searchable items. The search engine uses an index to determine the searchable items that satisfy a search, and retrieves from the same database both the default listings and the non-default items associated with those searchable items that satisfy the search.

Search Results Delivery

After a subscription has been received for a particular web page or domain, the associated non-default items are delivered whenever the search results include search result listings that correspond to the web page or domain. Specifically, after identifying the matching documents and prior to delivering the search results to a search engine user, the search engine (1) performs lookups in the subscribed web page index using index values generated based on the web pages represented in the search results and/or (2) performs lookups in the subscribed domain names index using index values generated based on the domain names of the web pages represented in the search results. If the lookup operations locate any non-default items that have been associated with any of the search results, then those non-default items are included in the search results web page that is delivered to the search engine user.

FIG. 1A illustrates a browser that is displaying a search results page that includes search result listings that include non-default items. Specifically, listings 1 and 5 include graphic images and/or text 140a, 140b, respectively, with non-default attributes. It should be noted that certain portions of all listings are underlined, and may appear in a different color than other text. However, even those portions constitute "default" in that they merely reflect the default attributes for the type of elements that they are (i.e. hypertext links). For example, default items 110 each contain a listing number, an underlined title, a text block of limited size, and an underlined link.

FIG. 1B illustrates a browser that is displaying another search results page that includes search result listings that include non-default items. Specifically, listing 1 includes a graphic image 150a, and listing 5 includes a banner 150b. Selection of the banner may cause retrieval of the web page associated with the listing, or an entirely different web page. Default items 120 are similar to default items 110, described above.

Certain types of non-default items, such as graphics, are included in the search results page by embedding tags to such items in the web page. When a browser decodes such tags, the browser retrieves the items, and displays the retrieved items at the appropriate locations within the web page. When the non-default item is text with one or more non-default font attributes, the non-default item may simply be included in the search result web page by storing font attribute information at locations within the search result web page to cause all or a portion of the appropriate search result listing to display those non-default attributes.

In some implementations, the party that provides the front end to the search engine is a different party than the party that controls the search engine. In such implementations, the search engine may provide the non-default items along with the standard search result listings to the front end provider, and the front end provider includes both the standard search result listings and the non-default items in the search results page that it delivers to the user.

Non-Default Item Uses

There is virtually no limit to types of non-default items that can be displayed with the search result listings associated with web pages. For example, the items may be active, passive, visual, audio, may reflect the content of the associated web page or may have no logical relationship with the associated web page. Consequently, there is virtually no limit to the uses that such non-default items can be put. A typically use of such non-default items would be to entice the search engine user to select the associated page. Graphics, animations, sounds, non-default text styles may all serve this purpose. However, other less-conventional uses are also possible. For example, web page owner that sells items over the Internet may pay a search engine provider to associated a "click-to-buy" button for an item with the web page that describes the item. Consequently, when that web page satisfies the results of a search, the search result listing that is presented to the search engine user will include the click-to-buy button.

Search Domain

The techniques described herein have been described in an embodiment in which the search domain is web documents on the World Wide Web. However, the techniques are not limited to searches performed in this domain. For example, search engines used to locate electronic items within any intranet or extranet network may also effectively employ the techniques. Further, the searchable items are not limited to web pages, but may include other types of electronic files, such as text files, word processing documents, graphics or even sound files. When the search is for non-text items such as graphics, the default search result listing for the items may include, for example, thumbnails of the graphics. However, the techniques provided herein allow non-default material that is separate and distinct from the search items themselves to be associated with the listings. For example, a company may associate its logo with a set of images that the company has created. When one of those images is listed in the results page of a image-based search engine, the search engine includes the logo in the listing.

Hardware Overview

Figure 2:
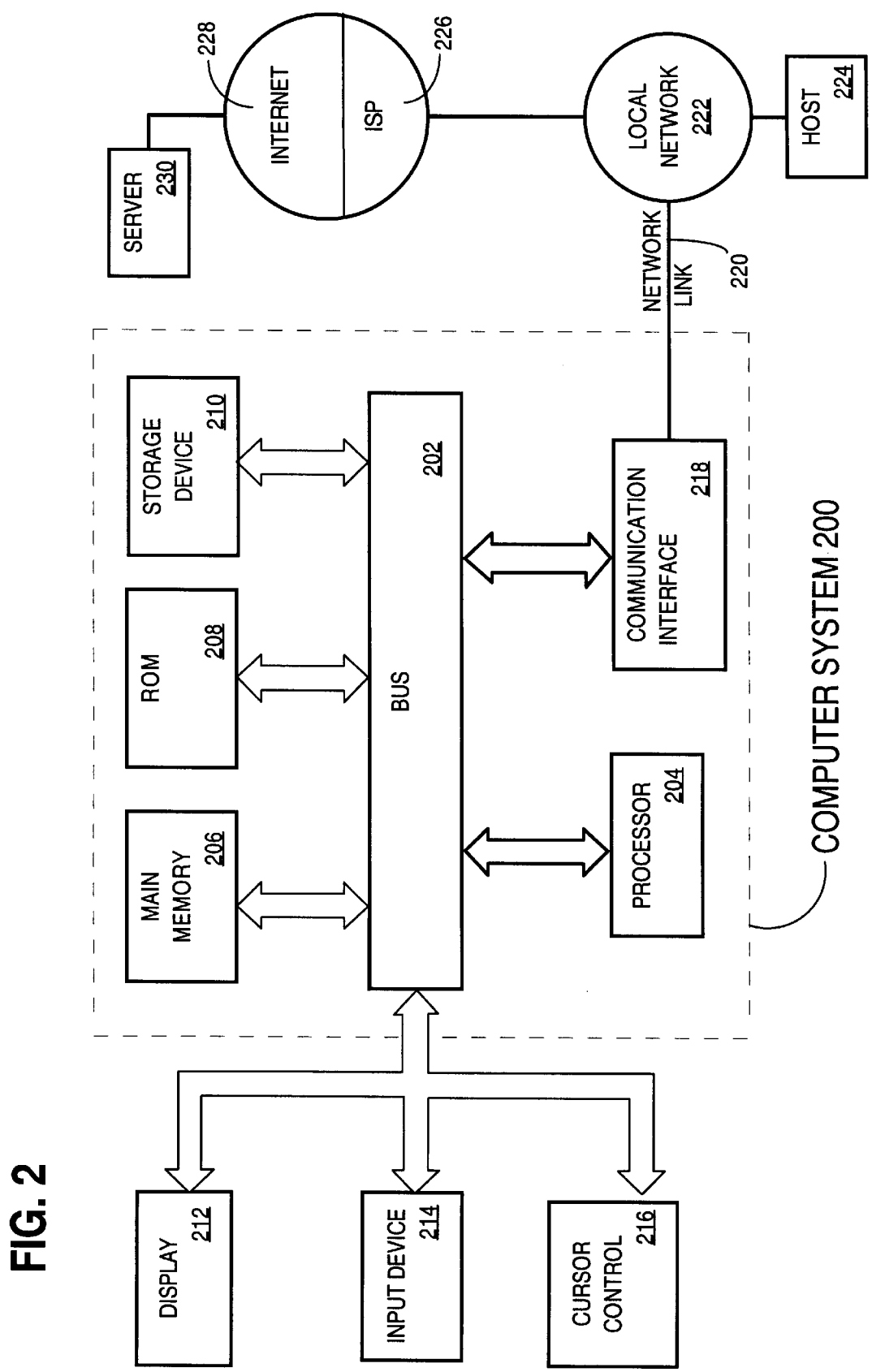
FIG. 2 is a block diagram of a computer system that may be used to implement embodiments of the invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for delivering search results for searches conducted over a network, the method comprising the steps of:

establishing an association between one or more searchable items and one or more non-default items that are separate from said one or more searchable items;

in response to a search that is initiated at a client on said network, performing the steps of identifying a set of searchable items that satisfy said search;

inspecting a mapping to determine whether any searchable items in said set of searchable items are associated with non-default items; and delivering search results over said network to said client, wherein said search results include any non-default items that are associated with the searchable items that are in said set of searchable items;

wherein at least one non-default item of the one or more non-default items is an animation.

2. The method of claim 1, wherein the step of delivering search results includes delivering search results that include a non-default animation item that is associated with the searchable items.

3. A computer-readable medium carrying one or more sequences of instructions which, when executed by one or more processors, causes the one or more processors to perform the method recited in claim 1.

4. A computer-readable medium carrying one or more sequences of instructions which, when executed by one or more processors, causes the one or more processors to perform the method recited in claim 2.

* * * * *